US008725553B1

(12) United States Patent
Turley et al.

(10) Patent No.: US 8,725,553 B1
(45) Date of Patent: May 13, 2014

(54) METHODS AND APPARATUSES FOR DETERMINING A VALUE ATTRIBUTABLE TO AN ATM

(75) Inventors: Stephen Patrick Turley, New York, NY (US); Steven Dudley Green, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 799 days.

(21) Appl. No.: 12/511,259

(22) Filed: Jul. 29, 2009

(51) Int. Cl.
*G06Q 30/00* (2012.01)
*G06Q 30/02* (2012.01)

(52) U.S. Cl.
CPC ................... *G06Q 30/0205* (2013.01)
USPC ........................................ 705/7.34

(58) Field of Classification Search
CPC ................................. G06Q 30/0205
USPC ........................................ 705/7.34
See application file for complete search history.

(56) References Cited

U.S. PATENT DOCUMENTS

| 7,039,600 | B1 * | 5/2006 | Meek et al. | 705/14.36 |
| 2002/0082994 | A1 * | 6/2002 | Herziger | 705/43 |
| 2004/0215566 | A1 * | 10/2004 | Meurer | 705/43 |

OTHER PUBLICATIONS

Chaudhry, A. 2004. "CRM: Making it Simple for the Banking Industry." Paper 180, SAS Institute-SUGI 29.*
"Revenue Function", Radford.edu website from web.archive.org Feb. 25, 2008, p. 1.*
"CRM Making it Simple for the Banking Industry," A. Chaudhry, Paper 180, SAS Institute, 2004.*

* cited by examiner

*Primary Examiner* — Justin M Pats
*Assistant Examiner* — Amanda Gurski
(74) *Attorney, Agent, or Firm* — Michael A. Springs; Morre & Van Allen PLLC; Esther F. Queen

(57) ABSTRACT

Embodiments of the present invention relate to methods and apparatuses for determining a value attributable to an automated teller machine (ATM). For example, in one embodiment, a method is provided that includes using a processor to determine a value attributable to an ATM based at least partially on a comparison of financial account information associated with ATM users to financial account information associated with non-ATM users.

13 Claims, 8 Drawing Sheets

INPUTS FOR MONTHLY INDIRECT REVENUE MODEL (PROPOSED REMOTE ATM)

| | | | |
|---|---|---|---|
| RELATIONSHIP MANAGER 516A | JOHN DOE 516B | MONTHLY ON-US DEPOSITS 563A | 2,340 563B |
| NUMBER OF ATM SITES 517A | 1 517B | MONTHLY ON-US WITHDRAWALS 564A | 4,567 564B |
| INSTALL DATE (MM/YY) 518A | 08/09 518B | MONTHLY ON-US OTHER TRANSACTIONS 565A | 860 565B |
| LENGTH OF CONTRACT (IN MONTHS) 519A | 12 519B | MONTHLY FOREIGN WITHDRAWALS 566A | 1,109 566B |
| TOTAL NUMBER OF ATMS 520A | 1 520B | MONTHLY FOREIGN OTHER TRANSACTIONS 567A | 633 567B |
| SITE NAME 521A | ANYCITY OFFICE BUILDING 521B | TOTAL MONTHLY FOREIGN TRANSACTIONS 568A | 1,742 568B |
| SITE TYPE 522A | OFFICE 522B | TOTAL MONTHLY ON-US TRANSACTIONS 569A | 7,767 569B |
| DEPLOYMENT TYPE 523A | FREE STANDING 523B | TOTAL MONTHLY TRANSACTIONS 570A | 9,509 570B |
| BRANDING TYPE 524A | BRANDED 524B | | |
| FUNCTIONALITY TYPE 525A | FULL FUNCTION 525B | | |
| APPROACH TYPE 526A | WALK UP 526B | | |
| CITY 527A | ANYCITY 527B | | |
| STATE 528A | ANYSTATE 528B | | |
| METROPOLITAN AREA 529A | ANYCITY-ANYTOWN, ANYSTATE 529B | | |
| LATITUDE 530A | 38.9123 530B | | |
| LONGITUDE 560A | -94.3123 560B | | |
| NEAREST BANKING CENTER 561A | ANYSTREET BANKING CENTER 561B | | |
| NEAREST ATM 562A | ANYCITY GAS STATION 562B | | |

OUTPUTS FOR MONTHLY INDIRECT REVENUE MODEL (PROPOSED REMOTE ATM)

501

| 532A RETENTION PREMIUM | 533A MONTHLY TRANSACTIONS PER USER HOUSEHOLD | 534A ALLOCATION PERCENTAGE | 535A AVERAGE MONTHLY REVENUE PER USER HOUSEHOLD | 536A NEW SALE PREMIUM | 537A CROSS SALE PREMIUM | 538A NEW USER HOUSEHOLD PERCENTAGE | 539A EXISTING USER HOUSEHOLD PERCENTAGE | 540A AVERAGE REVENUE PER SALE | 541A MIGRATION COST SAVE PER USER HOUSEHOLD |
|---|---|---|---|---|---|---|---|---|---|
| 2.70% | 2.87 | 62.30% | $99 | 8.32% | -0.34% | 7% | 93% | $102 | $0.08 |
| 532B | 533B | 534B | 535B | 536B | 537B | 538B | 539B | 540B | 541B |

531 ↑

| 543A PROJECTED USER HOUSEHOLDS | 544A ALLOCATED RETENTION PREMIUM | 545A NEW USER HOUSEHOLDS | 546A EXISTING USER HOUSEHOLDS | 547A ALLOCATED MONTHLY NEW SALES | 548A ALLOCATED MONTHLY CROSS SALES | 549A ESTIMATED MONTHLY RETENTION REVENUE | 550A ESTIMATED MONTHLY NEW SALE REVENUE | 551A ESTIMATED MONTHLY CROSS SALE REVENUE | 552A ESTIMATED MONTHLY MIGRATION REVENUE | 553A ESTIMATED MONTHLY INDIRECT REVENUE |
|---|---|---|---|---|---|---|---|---|---|---|
| 2,706 | 1.68% | 189 | 2,517 | 0.82 | -0.44 | $4,501 | $84 | -$45 | $216 | $4,756 |
| 543B | 544B | 545B | 546B | 547B | 548B | 549B | 550B | 551B | 552B | 553B |

METHODS AND APPARATUSES FOR DETERMINING A VALUE ATTRIBUTABLE TO AN ATM

FIELD

In general terms, embodiments of the present invention relate to methods and apparatuses for determining a value attributable to an automated teller machine (ATM).

BACKGROUND

Conventional methods for determining the value attributable to an automated teller machine (ATM) are often based only on the revenue and expense directly associated with that ATM, e.g., the ATM's additional cost revenue, interchange revenue, depreciation expense, occupancy expense, etc. As such, these methods do not understand or appreciate the indirect value attributable to the ATM to a financial institution or other organization that maintains the ATM. Accordingly, there is a long-felt but unmet need for a method and/or apparatus that is configured to determine the indirect value attributable to an ATM, so that its total value may be better appreciated and understood.

SUMMARY OF SELECTED EMBODIMENTS OF THE PRESENT INVENTION

Embodiments of the present invention relate to methods and apparatuses for determining a value attributable to an automated teller machine (ATM). For example, in one embodiment, a method is provided that includes using a processor to determine a value attributable to an ATM based at least partially on a comparison of financial account information associated with ATM users to financial account information associated with non-ATM users.

In some embodiments, the ATM includes an existing ATM, the ATM users have used the existing ATM at least once during a predetermined period of time, and the non-ATM users have not used the existing ATM during the predetermined period of time. In some embodiments, the ATM includes a proposed ATM, the ATM users have used another one or more ATMs at least once during a predetermined period of time, and the non-ATM users have not used the another one or more ATMs at least once during the predetermined period of time. In some embodiments, at least one of the ATM users or non-ATM users resides in the same predetermined geographic area where the ATM is located. In some embodiments, the ATM includes a remote ATM, the ATM users include remote ATM users, and the non-ATM users include non-remote ATM users.

In some embodiments, the comparison of financial account information associated with ATM users to financial account information associated with non-ATM users includes comparing the number of ATM users that are retained as customers by a financial institution over a predetermined period of time to the number of non-ATM users that are retained as customers by the financial institution over the predetermined period of time. In some embodiments, the comparison of financial account information associated with ATM users to financial account information associated with non-ATM users includes comparing sales of financial institution products made to the ATM users during a predetermined period of time to sales of financial institution products made to the non-ATM users during the predetermined period of time. For example, in some embodiments, the ATM is maintained by a financial institution, and the ATM users and non-ATM users include persons who became customers of the financial institution before the predetermined period of time. In some embodiments, the ATM is maintained by a financial institution, and the ATM users and non-ATM users include persons who became customers of the financial institution during the predetermined period of time.

In some embodiments, the comparison of financial account information associated with ATM users to financial account information associated with non-ATM users includes comparing a cost associated with performing a transaction using an ATM to a cost associated with performing a transaction without using an ATM. Some embodiments of the method further include using the processor to determine the value attributable to the ATM based at least partially on at least one of a functionality type, approach type, location type, site type, branding type, or deployment type associated with the ATM. In some embodiments, each ATM user includes an ATM user household and each non-ATM user includes a non-ATM user household. In some embodiments, the ATM includes one or more individual ATMs or one or more networks of ATMs.

Embodiments of the present invention also include a system that includes a processor configured to determine a value attributable to an ATM based at least partially on a comparison of financial account information associated with ATM users to financial account information associated with non-ATM users.

In some embodiments, the comparison of financial account information associated with ATM users to financial account information associated with non-ATM users includes a comparison of the number of ATM users that are retained as customers by a financial institution over a predetermined period of time to the number of non-ATM users that are retained as customers by the financial institution over the predetermined period of time. In some embodiments, the comparison of financial account information associated with ATM users to financial account information associated with non-ATM users includes a comparison of sales of financial institution products made to the ATM users during a predetermined period of time to sales of financial institution products made to the non-ATM users during the predetermined period of time. In some embodiments, the comparison of financial account information associated with ATM users to financial account information associated with non-ATM users includes a comparison of a cost associated with performing a transaction using an ATM to a cost associated with performing a transaction without using an ATM.

In some embodiments, the processor is further configured to determine the value attributable to the ATM based at least partially on at least one of a functionality type, approach type, location type, site type, branding type, or deployment type associated with the ATM. In some embodiments, the system further includes a datastore, the datastore being operatively connected to the processor, wherein the datastore includes financial account information associated with the ATM users and financial account information associated with the non-ATM users.

Embodiments of the present invention also include an apparatus that includes an application stored in memory of the apparatus, where the application is configured to determine a value attributable to an ATM based at least partially on a comparison of financial account information associated with ATM users to financial account information associated with non-ATM users. In some embodiments, the comparison includes at least one of: (1) comparing the number of ATM users that are retained as customers by the financial institution over a predetermined period of time to the number of non-ATM users that are retained as customers by the financial institution over the predetermined period of time; or (2) comparing sales of financial institution products made to the ATM users over a predetermined period of time to sales of financial institution products made to the non-ATM users over the predetermined period of time.

In some embodiments, the ATM users have used the ATM at least once during the predetermined period of time, the non-ATM users have not used the ATM during the predetermined period of time, and the non-ATM users reside in the same predetermined geographic area where the ATM is located. In some embodiments, the application is further configured to determine the value attributable to the ATM based at least partially on at least one of a functionality type, approach type, location type, site type, branding type, or deployment type associated with the ATM.

Embodiments of the present invention also include an apparatus that includes an application stored in memory of the apparatus, where the application is configured to determine a value attributable to an ATM based at least partially on at least one of a functionality type, approach type, location type, site type, branding type, or deployment type associated with the ATM. In some embodiments, the application is further configured to determine the value attributable to the ATM based at least partially on at least one of a retention premium, cross sale premium, or new sale premium, and wherein the at least one of the retention premium, cross sale premium, or new sale premium is based at least partially on at least one of the functionality type, approach type, location type, site type, branding type, or deployment type associated with the ATM.

Embodiments of the present invention also include a method that includes: (1) launching a computer-executable application, wherein the computer-executable application includes a graphical user interface; (2) inputting, into the graphical user interface, information associated with a type of ATM; and (3) receiving, via the graphical user interface, information associated with an estimated indirect revenue attributable to the ATM, wherein the estimated indirect revenue attributable to the ATM is based at least partially on the type of ATM. In some embodiments, the inputting, into the graphical user interface, information associated with a type of ATM includes inputting at least one of a site type, deployment type, location type, functionality type, branding type, or approach type associated with the ATM.

In some embodiments, the type of ATM is used by the computer-executable application to determine at least one of a retention premium, a cross sale premium, or a new sale premium, and wherein the estimated indirect revenue is based at least partially on the at least one of a retention premium, a cross sale premium, or a new sale premium. In some embodiments, the method further includes inputting, into the graphical user interface, information associated with a number of transactions associated with the ATM, and wherein the estimated indirect revenue attributable to the ATM is based at least partially on the number of transactions associated with the ATM.

Embodiments of the present invention also include a computer program product including a computer-readable medium including computer-executable program code portions stored therein. In some embodiments, the computer-executable program code portions include: (1) a first program code portion configured to receive financial account information associated with a plurality of ATM users and non-ATM users; (2) a second program code portion configured to use the financial account information to determine a difference between the plurality of ATM users and the non-ATM users; and (3) a third program code portion configured to use the difference between the plurality of ATM users and the non-ATM users to determine a value attributable to an ATM.

In some embodiments, the difference between the plurality of ATM users and the non-ATM users is based on a comparison in the number of ATM users that are retained as customers by a financial institution over a predetermined period of time to the number of non-ATM users that are retained as customers by the financial institution over the predetermined period of time. In some embodiments, the difference between the plurality of ATM users and non-ATM users is based on a comparison in sales of financial institution products made to the ATM users during a predetermined period of time to sales of financial institution products made to the non-ATM users during the predetermined period of time. In some embodiments, the difference between the plurality of ATM users and non-ATM users is based on a comparison in a cost associated with performing a transaction using an ATM to a cost associated with performing a transaction without using an ATM. In some embodiments, the third program code portion is configured to use at least one of a functionality type, approach type, location type, site type, branding type, or deployment type associated with the ATM to determine the value attributable to the ATM.

Embodiments of the present invention also include a computerized apparatus that includes a processor, the processor configured to determine an indirect revenue attributable to an ATM during a predetermined period of time, wherein the ATM is maintained by a financial institution, and wherein the processor is configured to determine the indirect revenue based at least partially on: (1) a retention revenue, wherein the retention revenue is based at least partially on a number of ATM users, an average revenue per ATM user that is generated by the financial institution over the predetermined period of time, a retention premium, and an allocation percentage, wherein the ATM users are financial institution customers that have used an ATM at least once during the predetermined period of time; (2) a cross sale revenue, wherein the cross sale revenue is based at least partially on an average revenue per sale of a financial institution product over the predetermined period of time, a cross sale premium, the allocation percentage, and the number of ATM users that became financial institution customers before the predetermined period of time; and (3) a new sale revenue, wherein the new sale revenue is based at least partially on the average revenue per sale of a financial institution product over the predetermined period of time, a new sale premium, the allocation percentage, and the number of ATM users that became financial institution customers during the predetermined period of time.

BRIEF DESCRIPTION OF THE DRAWINGS

Figure 1:
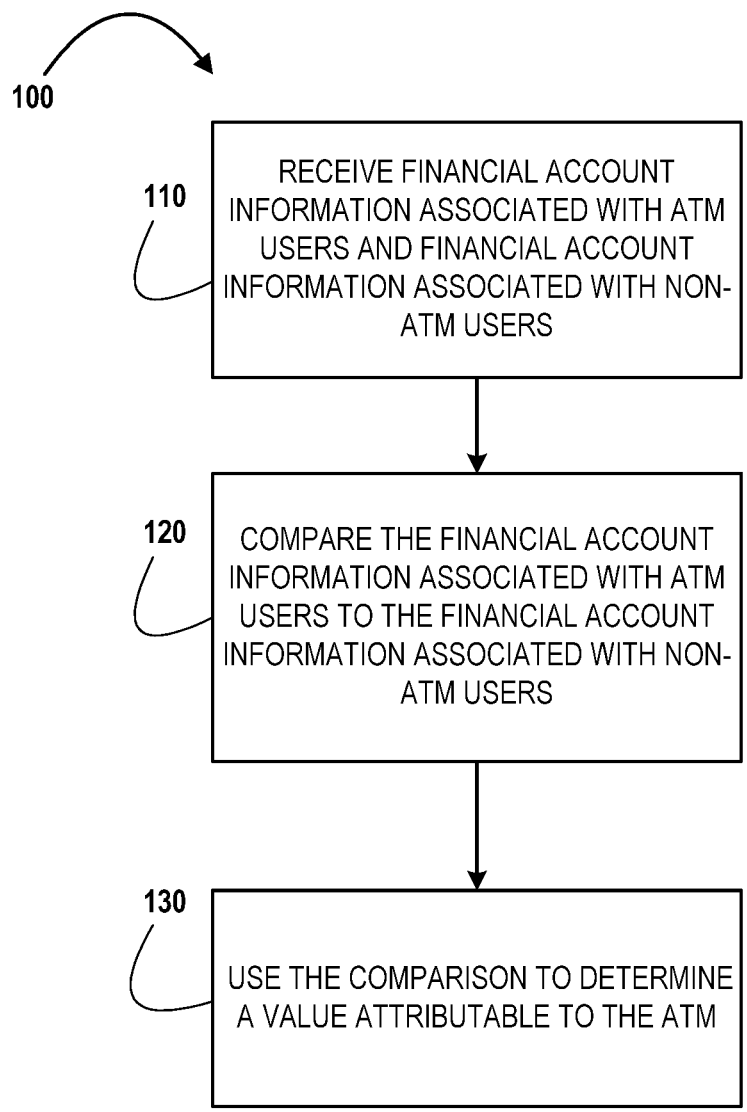
Figure 2:
Figure 3:
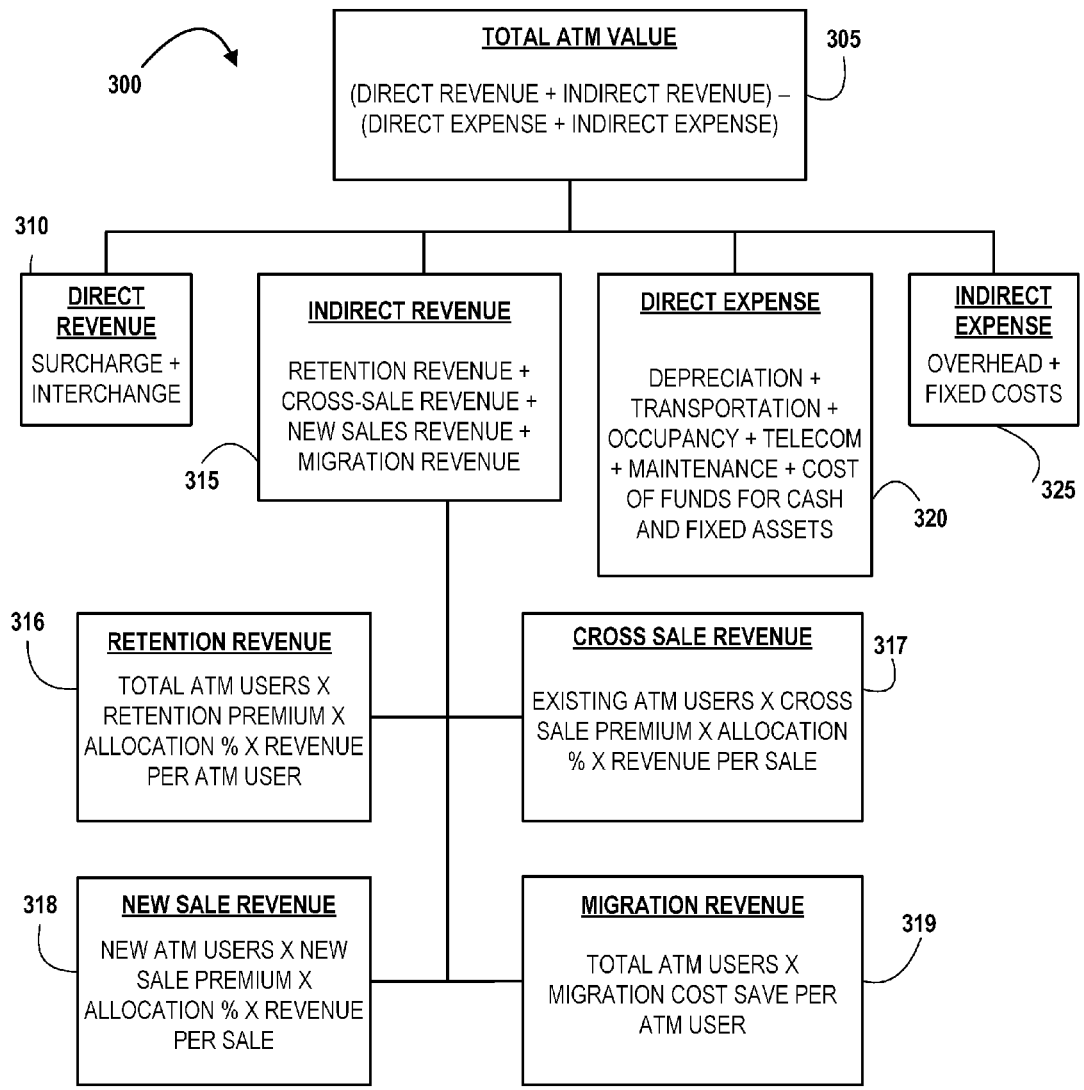
Figure 4:
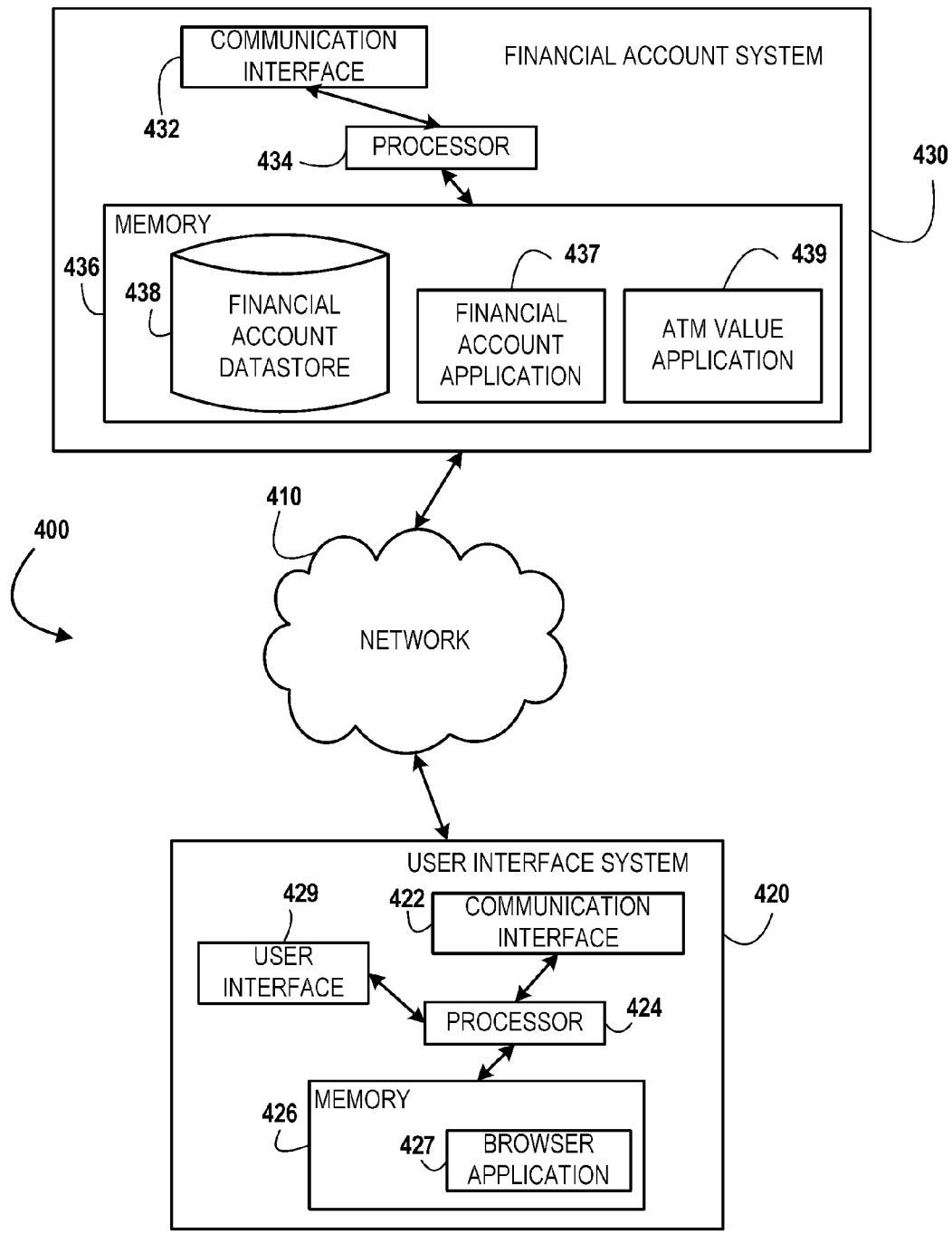
Figure 5C:
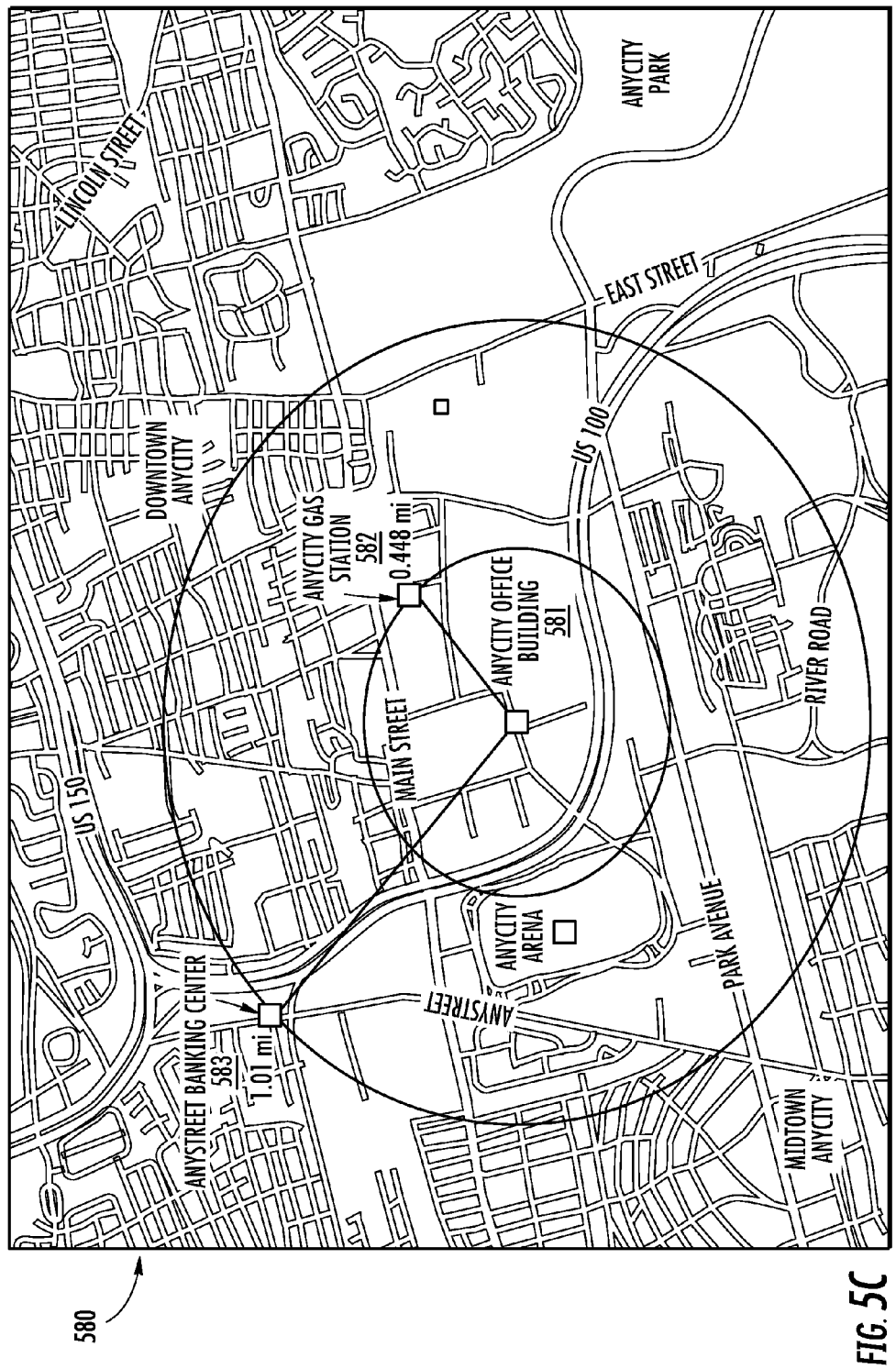
Figure 5D:

Having thus described embodiments of the present invention in general terms, reference will now be made to the accompanying drawings, wherein:

FIG. 1 is a flow diagram illustrating a general process flow of a system configured to determine a value attributable to an ATM, in accordance with an embodiment of the present invention;

FIG. 2 is a table illustrating exemplary comparisons, over the period of one year, of financial account information associated with financial institution customers that are ATM users to financial account information associated with financial institution customers that are non-ATM users, in accordance with an embodiment of the present invention;

FIG. 3 is a block diagram illustrating one way of determining a total value attributable to an ATM based at least partially on the indirect revenue attributable to the ATM, which is based at least partially on a retention premium, a cross sale premium, and/or a new sale premium, in accordance with an embodiment of the present invention;

FIG. 4 is a block diagram illustrating technical components of a system configured to determine the indirect and/or total value attributable to an ATM, in accordance with an embodiment of the present invention;

FIG. 5A is an exemplary graphical user interface that represents user inputs associated with determining the estimated monthly indirect revenue attributable to a proposed remote ATM, in accordance with an embodiment of the present invention;

FIG. 5B is an exemplary graphical user interface that represents outputs associated with determining the estimated monthly indirect revenue attributable to a proposed remote ATM, in accordance with an embodiment of the present invention;

FIG. 5C is an exemplary map that shows the geographic location of a proposed remote ATM, in accordance with an embodiment of the present invention; and FIG. 5D is an exemplary photograph illustrating an ATM in its surrounding environment, in accordance with an embodiment of the present invention.

DETAILED DESCRIPTION OF EMBODIMENTS OF THE PRESENT INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, or any other apparatus), method (including, for example, a business process, computer-implemented process, or any other process and/or method), and/or any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product having a computer-readable storage medium having computer-executable program code portions embodied in the medium. As used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Any suitable computer-readable medium may be utilized. The computer-readable medium may be, for example but not limited to, an electronic, magnetic, optical, electromagnetic, infrared, and/or semiconductor system, apparatus, and/or device. For example, in one embodiment, the computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or other tangible optical or magnetic storage device.

Computer-executable program code for carrying out operations of the present invention may be written in object-oriented, scripted and/or unscripted programming languages such as Java, Perl, Smalltalk, C++, SAS, SQL, or the like. However, the computer-executable program code portions for carrying out operations of the invention may also be written in conventional procedural programming languages, such as the "C" programming language and/or similar programming languages.

Some embodiments of the present invention are described herein with reference to flowchart illustrations and/or block diagrams of systems, methods, and computer program products according to embodiments of the invention. It will be understood that each block included in the flowchart illustrations and/or block diagrams, and combinations of blocks included in the flowchart illustrations and/or block diagrams, may be implemented by computer-executable program code. The computer-executable program code may be provided to a processor of a general purpose computer, special purpose computer, or other programmable data processing apparatus to produce a particular machine, such that the computer-executable program code portions, which execute via the processor of the computer or other programmable data processing apparatus, create mechanisms for implementing the functions and/or acts specified in the flowchart and/or block diagram block(s).

The computer-executable program code portions may also be stored in a computer-readable memory that can direct a computer and/or other programmable data processing apparatus to function in a particular manner, such that the instructions stored in the computer-readable memory produce an article of manufacture including instruction mechanisms which implement the function/act specified in the flowchart and/or block diagram block(s).

The computer-executable program code portions may also be loaded onto a computer or other programmable data processing apparatus to cause a series of operational steps to be performed on the computer and/or other programmable apparatus to produce a computer-implemented process such that the computer-executable program code which executes on the computer and/or other programmable apparatus provides steps for implementing the functions/acts specified in the flowchart and/or block diagram block(s). Alternatively, computer-implemented steps and/or acts may be combined with operator and/or human implemented steps and/or acts in order to carry out an embodiment of the present invention.

It will be understood that although many of the embodiments of the present invention described herein are generally described as involving a "financial institution," other embodiments of the invention may involve one or more persons, organizations, businesses, and/or other entities that take the place of, or work in conjunction with, the financial institution to perform one or more of the processes and/or events described herein as being performed by the financial institution.

It will also be understood that an automated teller machine (ATM), as used herein, refers to an automated terminal, kiosk, and/or other machine that is configured to perform, provide, and/or otherwise facilitate financial services, such as, for example, dispensing cash, providing financial account balances, facilitating bill payments, etc. In some embodiments, the ATM may be held, controlled, operated, managed, serviced, stored, maintained, and/or the like (herein "maintained" for simplicity) by a bank, financial institution, or some other entity. In some embodiments, the ATM may be operatively connected to a data system and/or financial services network, including, for example, a network maintained by a financial institution that maintains the ATM. Although the term "ATM" and "network of ATMs" are sometimes used separately herein, it will be understood that the term "ATM" may include any one or more ATMs and/or any one or more ATM networks. For example, according to one embodiment, an ATM refers to the entire ATM network maintained by a particular financial institution. Additionally, it will be understood that an ATM may refer to an individual ATM, the one or more ATMs located at a particular site (e.g., a banking center, shopping center, gas station, etc.), the ATMs located in a predetermined geographic area (e.g., block, street, neighborhood, city, county, state, country, particular longitude and/or latitude, etc.), and/or the like. Still further, it will be understood that the term "ATM", as used herein, may include any existing or proposed ATM, including, for example, an existing ATM that needs a lease renewal, a proposed ATM that has not yet been constructed, and/or some other type of existing or proposed ATM.

It will also be understood that, in some embodiments, the ATM may provide partial functionality, such as, for example, providing mainly (or only) cash dispensing services. However, in other embodiments, the ATM may provide additional functionalities and/or be considered a "full function" ATM configured to additionally provide cash dispensing services, depository services, and/or any and all (or nearly all) of the financial services typically associated with an ATM. In some embodiments, the ATM includes a particular type of branding, such as, for example, branding by a financial institution (e.g., placing "Bank A" somewhere on the structure of the ATM). In some embodiments, the ATM does not include any branding at all (e.g., an "unbranded" ATM). In some embodiments, the ATM includes a particular type of deployment, such as, for example, freestanding, storefront, through the wall (TTW), kiosk, walk-in building, etc. In other embodiments, the ATM is defined by how ATM users approach the ATM, such as, for example, drive-up, walk-up, etc. In addition, the ATM may be associated with a particular type of structure, area, setting, and/or site (sometimes referred to herein as a "site type" or "site description"), such as, for example, airport, community retail center, neighborhood retail center, highway rest area, hospital, hotel, office, power retail center, retail factory outlet, mixed use, office, employee, non-employee, transportation, club store, strip retail center, university on campus, university off campus, standalone commercial, sports, store, retail store, restaurant, supermarket, convenience store, gas station, tourist, lifestyle retail center, movie theater, village center, mall, urban retail, casino, shopping center, mall, gas station, school, and/or the like. In other embodiments, the ATM may be associated with a particular geographic location and/or type of location (sometimes referred to herein as a "location type"), such as, for example, indoor, outdoor, interior, exterior, unattended, attended, public, private, in-footprint, out-of-footprint, banking center, remote ATM (e.g., not located in or adjacent to a banking center, located away from a banking center, etc.), city, state, county, region, country, a particular longitude and/or latitude, and/or the like.

In general terms, embodiments of the present invention relate to methods and apparatuses for determining a value attributable to an ATM, such as, for example, an indirect value attributable to an ATM and/or a total value attributable to an ATM. For example, in one embodiment, a method and/or apparatus is capable of determining a value attributable to a financial institution ATM based at least partially on a comparison of financial account information associated with financial institution customers that have used and/or use the ATM (sometimes referred to herein as "ATM users") to financial account information associated with financial institution customers that have not used and/or do not use the ATM (sometimes referred to herein as "non-ATM users"). It will be understood that, in other embodiments, ATM users and/or non-ATM users may be defined in other ways.

In one embodiment, one comparison may be based at least partially on the incremental difference in retention rates between these ATM users and non-ATM users over a predetermined period of time (e.g., month, year, quarter, decade, etc.). In another embodiment, a comparison is based at least partially on the incremental difference in sales made to ATM users and non-ATM users over a predetermined period of time. In another embodiment, a comparison is based at least partially on sales made to existing and/or new ATM users and existing and/or new non-ATM users over a predetermined period of time. Using these one or more (or other) comparisons, embodiments of the present invention may be used to determine (e.g., project, estimate, predict, calculate, allocate, evaluate, identify, model, and/or otherwise determine) the indirect value and/or total value that may be attributable to an individual ATM and/or network of ATMs.

It will be understood that the phrase "attributable to" may include, but is not limited to, its ordinary dictionary definitions, as well as the following terms and/or phrases: of (e.g., "the total value of an ATM"), allocated to, associated with, accredited to, generated by, assigned to, and/or the like. It will also be understood that the term "value" may include, but is not limited to, its ordinary dictionary definitions, as well as the following terms and/or phrases: profit, liability, revenue, expense, benefit, detriment, and/or the like. It will also be understood that the term "sale" may include any sale of a good and/or service (for simplicity, goods and/or services will herein be referred to as "products"). In some embodiments, a sale includes a financial product (e.g., a financial account (e.g., checking account, credit card account, etc.), a line of credit, a mortgage, school loan, etc.), and in some embodiments, a sale includes a non-financial product (e.g., a keychain, a stuffed animal, etc.). In some embodiments, a sale refers to a financial institution product. In some embodiments, a sale includes only sales of deposit products (e.g., checking accounts, savings accounts, etc.). In some embodiments, a sale refers to the sale of any product associated with an ATM and/or any financial institution product that an ATM user may enjoy, use, maintain, and/or control via an ATM.

It will also be understood that the phrase "financial account information", as used herein, may include any information associated with a financial account, including, for example, personal information (e.g., persons and/or entities associated with the financial account, addresses associated with the financial account, etc.), account type information (e.g., checking account, credit card account, etc.), account name information (e.g., "Bank A Platinum Credit Card", etc.), routing number and/or account number information, account balance information, financial transaction information (e.g., transaction amount, transaction date, parties involved in the transaction, type of transaction, whether the transaction involved the use of an ATM, etc.), and/or the like. It will also be understood that embodiments of the present invention may involve more than one financial institution and more than one type of financial institution customer, even though most of the embodiments described herein refer to a single financial institution and its customers. For example, some embodiments of the present invention are capable of determining a value of an ATM maintained by any financial institution and/or this determination may be based at least partially on the financial account information for all types of ATM users, including the financial account information of users who are not customers of the financial institution that maintains the ATM.

Referring now to FIG. 1, a general process flow 100 of a system for determining a value attributable to an ATM is illustrated, in accordance with an embodiment of the present invention. As represented by the block 110, the system is configured to first receive financial account information associated with ATM users and financial account information associated with non-ATM users. It will be understood that the ATM users and non-ATM users may be defined in any way that distinguishes between persons based on ATM use. For example, in some embodiments, ATM users are financial institution customers that have used the ATM at least once during a predetermined period of time (e.g., one year, six months, ever, a particular date range, and/or any other length of time), and non-ATM users are financial institution customers that have never used the ATM during the same predetermined period of time. As another example, in some embodiments, "ATM users" refers to remote ATM users (e.g., financial institution customers that have used a remote ATM at least once during the predetermined period of time), and "non-ATM users" refers to non-remote ATM users (e.g., financial institution customers that are ATM users but have not used a (and/or "the) remote ATM at least once during the predetermined period of time). Further, in some embodiments, ATM users and/or non-ATM users may reside in (and/or work in, commute through, travel to, etc.) the same predetermined geographic area (e.g., the same town, city, county, metropolitan area, state, region, country, near a particular latitude and longitude, etc.) where the ATM is located.

In addition, it will also be understood that the system having the process flow 100 may be configured to receive any amount and/or type of financial account information. For example, in one embodiment, the system is configured to receive information including, but not limited to, financial account information, financial transaction information, information associated with retention rates of ATM and/or non-ATM users, information associated with sales made to existing ATM and/or non-ATM users, information associated with sales made to new ATM users and/or new non-ATM users, etc. As another example, the system may be configured to receive financial account information particularly associated with an ATM, including, but not limited to, the estimated and/or actual number and/or type of ATM, ATM transactions, transaction amounts, transaction times and/or dates, ATM users, total revenue from sales involving the ATM over a predetermined period of time, average revenue per sale involving the ATM over a predetermined period of time, etc.

As represented by the block 120, the system is also configured to compare the financial account information associated with the ATM users to the financial account information associated with the non-ATM users. In some embodiments, this comparison includes comparing retention rates between the plurality of ATM users and non-ATM users over a predetermined period of time. In some embodiments, the comparison includes comparing the sales made to ATM users and non-ATM users. In some embodiments, the comparison includes comparing sales made to existing and/or new ATM users and non-ATM users. In some embodiments, the comparison includes determining one or more other differences between ATM users and non-ATM users. In some embodiments, these one or more differences include one or more incremental differences between a statistic associated with ATM users and a statistic associated with non-ATM users.

As represented by the block 130, the system having the process flow 100 is also configured to use the comparison to determine a value attributable to the ATM. It will be understood that the value attributable to the ATM may include and/or be based on any one or more factors, including, for example, direct revenue, indirect revenue, direct expense, and/or indirect expense attributable to the ATM. It will also be understood that the comparison described in the block 120 may be used to perform some calculation and/or other determination, which in turn, may be used to determine a value attributable to an ATM.

Referring now to FIG. 2, a table 200 is provided that illustrates exemplary comparisons, over the period of one year, of financial account information associated with financial institution customers that are ATM users to financial account information associated with financial institution customers that are non-ATM users, in accordance with an embodiment of the present invention. In one embodiment, the information provided in the table 200, or information similar to that provided in the table 200, may be used to determine a value attributable to an ATM. It will also be understood that one or more portions of the information provided in the table 200 may be based at least partially on financial transaction information stored in a financial account datastore. In one embodiment, a computer-executable application may be configured to determine the information provided in the table 200 by accessing the financial account datastore. In some embodiments, the financial account datastore may be maintained by one or more financial institutions and/or one or more other entities.

It will also be understood that the term "ATM," as used in connection with FIG. 2, refers to one or more individual ATMs and/or network of ATMs that are located in a predetermined geographic area and is/are maintained by a financial institution. In addition, the phrase "ATM users," as used in connection with FIG. 2, refers to past and/or present financial institution customers that have used the ATM at least once during the one year period. Further, the phrase "non-ATM users," as used in connection with FIG. 2, refers to past and/or present financial institution customers that have not used the ATM during the one year period and reside in the same predetermined geographic area as the ATM (e.g., neighborhood, city, county, state, the area within a one mile radius from the ATM, etc.). In other embodiments, ATM users and/or non-ATM users may be defined in other ways.

As shown in FIG. 2, the information provided in the table 200 is associated with two groups and three categories. The two groups include the "ATM users" group 206 and the "non-ATM users" group 207. The three categories include a "customer retention over one year" category 202, an "average annual sales to existing customers" category 203, and an "average annual sales to new customers" category 204. The "customer retention over one year" category 202 represents the percentage of customers that remained financial institution customers after the one year period. The "average annual sales to existing customers" category 203 represents the average annual sales of financial institution products to a person that has been a financial institution customer for longer than the one year period. The "average annual sales to new customers" category 204 represents the average annual sales of financial institution products to a person that has become a new financial institution customer within the one year period.

According to the specific information provided in the table 200, in this example, 94.0% of customers defined as ATM users were retained as financial institution customers over the one year period, whereas only 89.4% of customers defined as non-ATM users were retained over the same period. In addition, over the course of the one year period, the financial institution made an average of 0.641 sales to existing customers (sometimes referred to herein as "cross sales") defined as ATM users, whereas the institution made only an average of 0.612 sales to existing customers defined as non-ATM users. Further, over the course of the one year period, the financial institution made an average of 2.023 sales to new customers (sometimes referred to herein as "new sales) defined as ATM users, whereas the institution made only an average of 1.972 sales to new customers defined as non-ATM users.

In addition, the table 200 also provides information associated with a retention premium 208, a cross sale premium 209, and a new sale premium 211. As shown in FIG. 2, the retention premium 208 is associated with the information in the customer retention over one year category 202 and represents the incremental percentage difference in the retention rate over one year between ATM users and non-ATM users. The cross sale premium 209 is associated with information in the average annual sales to existing customers category 203 and represents the incremental percentage difference between the average annual sales to existing customers that are ATM users and the average annual sales to existing customers that are non-ATM users. The new sale premium 211 is associated with the information in the average annual sales to new customers category 204 and represents the incremental percentage difference between the average annual sales to new customers that are ATM users and the average annual sales to new customers that are non-ATM users. Based on this information, as shown in FIG. 2, in this example, the retention premium 208 is 4.60% (i.e., 94.0%–89.4%=4.60%), the cross sale premium 209 is 4.74% (i.e., (0.641–0.612)/0.612*100=4.74%), and the new sale premium 211 is 2.59% (i.e., (2.023–1.972)/1.972*100=2.59%). Based on the values for these premiums, it may be concluded that financial institution customers that are ATM users are more easily retained as financial institution customers than customers that are non-ATM users. It may also be concluded that existing financial institution customers that are ATM users account for more average annual sales than existing financial institution customers that are non-ATM users. In may be further concluded that new financial institution customers that are ATM users account for more average annual sales than new financial institution customers that are non-ATM users.

Of course, it will also be understood that information provided in the table 200 is provided for purposes of illustration and may or may not represent real financial account information associated with any real set of ATM users and/or non-ATM users. In addition, other embodiments of the present invention may involve information associated with a set of ATM users and/or non-ATM users that have different financial account information, which may in turn result in different customer retention rates, average annual cross and/or new sales numbers, retention premium values, cross sale premium values, and/or new sale premium values. Indeed, in some embodiments, the information may be such that any one or more of the retention premium value, cross sale premium value, and/or new sale premium value is/are zero or negative, instead of all of the premiums being positive, as shown in the table 200. It will also be understood that other embodiments of the present invention may represent one or more portions of the information provided in the table 200 in a different way, e.g., using only percentages, using only numbers, using a combination of percentages, numbers, characters, colors, symbols, etc. Further, it will be understood that the method for determining the premiums described in FIG. 2 is only one way to represent the comparisons between ATM users and non-ATM users. Other embodiments of the present invention may involve more, fewer, and/or different comparisons, may make those comparisons based on more, fewer, and/or different factors, and/or may make those comparisons using more, fewer, and/or different mathematical formulas. In addition, although the table 200 provides specific exemplary comparisons between ATM users and non-ATM users measured over a specific period of time, it will be understood that other embodiments of the present invention may include and/or use different periods of time.

Referring now to FIG. 3, in accordance with an embodiment of the present invention, a block diagram 300 is provided to illustrate one way of determining a total value attributable to an ATM based at least partially on a direct revenue, an indirect revenue, a direct expense, and an indirect expense attributable to the ATM, in accordance with an embodiment of the present invention. In one embodiment, the indirect revenue is based at least partially on a retention premium, a cross sale premium, and/or a new sale premium, which may be the same as or similar to those described in connection with FIG. 2.

As with FIG. 2, it will be understood that the term "ATM," as used in connection with FIG. 3, refers to an individual ATM that is located in a predetermined geographic area and is maintained by a financial institution. In addition, the phrase "ATM users," as used in connection with FIG. 3, refers to past and/or present financial institution customers that have used the ATM at least once during a predetermined period of time. Further, the phrase "non-ATM users," as used in connection with FIG. 3, refers to past and/or present financial institution customers that reside in the same predetermined geographic area as the ATM but have not used the ATM during the predetermined period of time. Additionally, the phrases "existing ATM users" and "existing non-ATM users," as used in connection with FIG. 3, refer to people that have been financial institution customers for longer than the predetermined period of time. Still further, the phrases "new ATM users" and "new non-ATM users," as used in connection with FIG. 3, refer to people that have become new financial institution customers during the predetermined period of time. In other embodiments, ATM users, non-ATM users, existing ATM users, existing non-ATM users, new ATM users, and/or new non-ATM users may be defined in other ways. For example, in some embodiments, the phrase "new ATM user" includes an existing financial institution customer (e.g., a person who became a customer of the financial institution before a predetermined period of time) that has used the ATM for the first time ever during the predetermined period of time.

As shown in FIG. 3, in accordance with an embodiment of the present invention, the total ATM value 305 may be determined based at least partially on the sum of the direct revenue 310 and the indirect revenue 315 minus the sum of the direct expense 320 and the indirect expense 325. In this embodiment, the direct revenue 310 represents the revenue directly attributable to the ATM and may be based at least partially on a sum of items including, for example, additional cost revenue and/or interchange revenue associated with the use of the ATM. For example, an ATM maintained by a financial institution may charge a fee for use by a person who is not a customer of the financial institution. The indirect revenue 315 represents the portion of the financial institution's total revenue that may be attributable to the ATM and may be based at least partially on a sum of items including, for example, retention revenue 316, cross sale revenue 317, new sale revenue 318, and/or migration revenue 319, all of which are explained in greater detail below. The direct expense 320 represents the expense directly attributable to the ATM and may be based at least partially on a sum of items including, for example, depreciation of the ATM, transportation (armored or otherwise) expense associated with maintaining the ATM, occupancy expense (e.g., lease costs, etc.), telecommunication expense (e.g., the expense associated with maintaining network communication with the ATM, etc.), maintenance expense (e.g., needed repairs, etc.), and/or the cost of funds for cash and fixed assets (e.g., the interest expense associated with keeping cash in the ATM and/or the opportunity cost of purchasing and/or maintaining the ATM itself). The indirect expense 325 represents the portion of the financial institution's total expense that may be attributable to the ATM and may be based at least partially on a sum of items including, for example, overhead costs and/or fixed costs, which may be, in one embodiment, indirectly related to operating the ATM.

As mentioned above, in one embodiment of the present invention, the indirect revenue 315 is based at least partially on the sum of four components: the retention revenue 316, the cross sale revenue 317, the new sale revenue 318, and the migration revenue 319. In accordance with some embodiments, the retention revenue 316 represents the revenue attributable to the ATM that is based at least partially on a retention premium, e.g., the percentage difference in the retention rate between ATM users and non-ATM users over the predetermined period of time. Additionally, the retention revenue 316 may be based at least partially on other items such as, for example, total ATM users, an allocation percentage, and/or revenue per ATM user generated by the financial institution. It will be understood that, in accordance with some embodiments of the present invention, as shown in FIG. 3, the retention revenue 316 includes the product of the total ATM users, the retention premium, the allocation percentage, and the revenue per ATM user. However, it will be understood that other embodiments of the present invention may determine retention revenue based on more, fewer, and/or different items and/or may determine retention revenue using a different mathematical formula.

It will be understood that, as used herein, the phrase "allocation percentage" may refer to the percentage of ATM user revenue that may be attributable to an ATM, the percentage of ATM user financial transactions that may be attributable to an ATM, the percentage of revenue associated with a particular one or more ATM users that may be attributable to an ATM, the percentage of financial transactions associated with a particular one or more ATM users that may be attributable to an ATM, and/or the like. In some embodiments, the allocation percentage is based at least partially on a predetermined geographic area (e.g., city, state, metropolitan area, etc.) in which the ATM is located. For example, in accordance with one embodiment, the allocation percentage associated with an ATM located in a large metropolitan area is typically less than the allocation percentage associated with an ATM located in a small metropolitan area. In some embodiments, this is because the large metropolitan area has more ATMs, which means that an ATM user residing in the large metropolitan area is more likely to use more than one ATM, and it is therefore more likely that the revenue generated by the ATM user and/or the financial transactions involving the ATM user is attributable to more than one ATM.

In accordance with some embodiments, the cross sale revenue 317 represents the revenue from cross sales that is attributable to the ATM. In some embodiments, a cross sale includes any sale made to an existing ATM user or existing non-ATM user during the predetermined period of time. In other embodiments, a cross sale only includes sales made to existing ATM users during the predetermined period of time. In some embodiments, the cross sale revenue 317 is based at least partially on a cross sale premium, e.g., the percentage difference in sales made to existing ATM users and sales made to existing non-ATM users during the predetermined period of time. Additionally, the cross sale revenue 317 may be based at least partially on other items such as, for example, existing ATM users, an allocation percentage, and/or revenue per sale. In some embodiments, as shown in FIG. 3, the cross sale revenue 317 includes the product of the existing ATM users, the cross sale premium, the allocation percentage, and the revenue per sale. However, it will be understood that other embodiments of the present invention may determine cross sale revenue based on more, fewer, and/or different items and/or may determine cross sale revenue using a different mathematical formula.

In accordance with some embodiments, the new sale revenue 318 represents the revenue from new sales that is attributable to the ATM. In some embodiments, a new sale includes any sale made to a new ATM user or new non-ATM user during the predetermined period of time. In other embodiments, a new sale only includes sales made to new ATM users during the predetermined period of time. It will be understood that, in accordance with some embodiments, a new ATM user (and/or new non-ATM user) may account for more than one new sale during the predetermined period of time. For example, if the financial institution sells a new ATM user a checking account and a savings account during the predetermined period of time, both of those sales are "new sales." In some embodiments, the new sale revenue 318 is based at least partially on a new sale premium, e.g., the percentage difference in sales made to new ATM users and sales made to new non-ATM users during the predetermined period of time. Additionally, the new sale revenue 318 may be based at least partially on other items such as, for example, new ATM users, an allocation percentage, and/or revenue per sale. In some embodiments, as shown in FIG. 3, the new sale revenue 318 includes the product of the new ATM users, the new sale premium, the allocation percentage, and the revenue per sale. However, it will be understood that other embodiments of the present invention may determine new sale revenue based on more, fewer, and/or different items and/or may determine new sale revenue using a different mathematical formula.

In some embodiments, as shown in FIG. 3, the indirect revenue 315 may additionally or alternatively be based at least partially on a migration revenue 319, which may represent, for example, the total cost savings associated with financial institution customers using an ATM to perform financial transactions instead of using a teller, banking center, and/or some other relatively costlier provider of financial services. In some embodiments, the migration revenue 319 may be based at least partially on items such as, for example, the total ATM users and/or a migration cost save per ATM user (e.g., a cost of a teller transaction–a cost of an ATM transaction). In one embodiment, as shown in FIG. 3, the migration revenue 319 includes the product of the total ATM users and the migration cost save per ATM user. However, it will be understood that other embodiments of the present invention may determine migration revenue based on more, fewer, and/or different items and/or may determine migration revenue using a different mathematical formula.

It will be understood that one or more of the embodiments described in connection with FIG. 3 and/or elsewhere herein may not represent a true and/or exact mathematical representation of the total value attributable to an ATM and/or a direct revenue, an indirect revenue, a direct expense, and/or an indirect expense attributable to an ATM. Instead, these embodiments represent particular ways of determining a total value attributable to an ATM and/or a direct revenue, an indirect revenue, a direct expense, and/or an indirect expense attributable to an ATM. As such, it will be understood that other embodiments of the present invention may determine one or more of these items in different ways without departing from the scope and spirit of the present invention. For example, in one embodiment, a total value attributable to an ATM may be determined in a different way, e.g., using a different mathematical formula, etc. In another embodiment, a total value attributable to an ATM may not be based on all of the items described in the block 305, e.g., the total value may not be based on a migration revenue and/or an indirect expense, etc. As still another example, in another embodiment, a total value attributable to an ATM may account for the same items described in FIG. 3 in a different way, e.g., a total value attributable to an ATM may be based on sales revenue that accounts for, but does not distinguish between, existing financial institution customers and new financial institution customers. In one embodiment of the present invention, the value attributable to an ATM is used more to compare existing ATMs and proposed ATMs to each other rather than to determine an actual accurate monetary value. Therefore, in some embodiments, rough approximations of one or more of the items may be acceptable.

Referring now to FIG. 4, a system 400 for determining a total value and/or a direct revenue, indirect revenue, direct expense, and/or indirect expense attributable to an ATM is provided, in accordance with an embodiment of the present invention. As illustrated, the system 400 includes a network 410, a user interface system 420, and a financial account system 430. Each of the portions of the system 400 may be selectively and operatively connected to the network 410, which may include one or more separate networks. In addition, the network 410 may include a local area network (LAN), a wide area network (WAN), and/or a global area network (GAN), such as the Internet. It will also be understood that the network 410 may be secure and/or unsecure and may also include wireless and/or wireline technology.

It will be understood that the user interface system 420 may include any computerized apparatus configured to perform any one or more of the functions of the user interface system 420, as described herein. In some embodiments, for example, the user interface system 420 may include one or more portions of a computer network, a personal computer system, a mobile phone, a personal digital assistant, a public kiosk, and/or the like. As illustrated in FIG. 4, according to an embodiment of the present invention, the user interface system 420 includes a communication interface 422, a processor 424, a memory 426 having a browser application 427 stored therein, and a user interface 429. In this embodiment, the communication interface 422 may be operatively and selectively connected to the processor 424, which may be operatively and selectively connected to the user interface 429 and the memory 426.

Each communication interface described herein, including the communication interface 422, generally includes hardware, and, in some instances, software, that enables a portion of the system 400, such as the user interface system 420, to transport, send, receive, and/or otherwise communicate information to and/or from the communication interface of one or more other portions of the system 400. For example, the communication interface 422 of the user interface system 420 may include a modem, server, electrical connection, and/or other electronic device that operatively connects the user interface system 420 to another electronic device, such as the electronic devices that make up the financial account system 430 and/or the network 410.

Each processor described herein, including the processor 424, generally includes circuitry for implementing the audio, visual, and/or logic functions of that portion of the system 400. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based on computer-executable program code portions thereof, which may be stored, for example, in a memory device, such as in the browser application 427 of the memory 426 of the user interface system 420.

Each memory device described herein, including the memory 426 for storing the browser application 427 and other data, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides, such as the user interface system 420, to implement the functions of the system within which the memory resides, such as the user interface system 420.

As shown in FIG. 4, the memory 426 includes the browser application 427. In one embodiment, the browser application 427 is operable to allow a user to communicate with the financial account system 430 and/or one or more other portions of the system 400. In another embodiment, the browser application 427 is operable for purposes of determining a total value attributable to an ATM and/or a direct revenue, an indirect revenue, a direct expense, and/or an indirect expense attributable to an ATM. For example, in one embodiment, a user uses the browser application 427 to send to the financial account system 430 information associated with one or more of the following: ATM users, non-ATM users, ATMs, ATM locations, ATM deployment types, ATM site types, estimated direct revenue and/or direct expense information attributable to the one or more ATMs, projected total transactions involving the one or more ATMs, and/or projected "on us" transactions involving the one or more ATMs (e.g., no-fee ATM transactions involving financial institution customers), etc. As another example, in another embodiment, the browser application 427 is configured to receive, display, and/or otherwise provide information associated with one or more user inputs (such as those described above), e.g., a retention premium, a cross sale premium, a new sale premium, the number of transactions per ATM user, etc. In another embodiment, the browser application 427 may be operable to provide information associated with outputs from one or more mathematical calculations of a total value attributable to an ATM and/or a direct expense, indirect expense, indirect revenue, and/or indirect revenue attributable to an ATM. In one embodiment, the browser application 427 includes an Internet web browser and/or some other graphical user interface for communicating with, navigating, controlling, and/or using the financial account system 430. In another embodiment, the browser application 427 includes a dashboard environment and/or some other graphical user interface for communicating with, navigating, controlling, and/or using the user interface system 420. In one embodiment, the browser application 427 includes and/or is configured to provide and/or use one or more portions of the graphical user interface 500 illustrated in FIG. 5A and described in more detail herein. In another embodiment, the browser application 427 includes and/or is configured to provide and/or use information associated with one or more of the mathematical formulas illustrated in the table 501 in FIG. 5B and described in more detail herein. In some embodiments, the browser application 427 includes computer-executable program code portions for instructing the processor 424 to perform any one or more of the functions of the browser application 427 described herein. In some embodiments, the browser application 427 may include and/or use one or more network and/or system communication protocols.

Also shown in FIG. 4 is the user interface 429. In some embodiments, the user interface 429 includes one or more user output devices, such as a display and/or speaker, for presenting information to a user. In some embodiments, the user interface 429 includes one or more user input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from a user. In one embodiment, the user interface 429 includes the input and display devices of a personal computer, such as a keyboard and monitor, that are operable to receive and display information associated with determining a value attributable to ATM. In one embodiment, the user interface 429 includes and/or is configured to provide and/or use one or more portions of the graphical user interface 500 illustrated in FIG. 5A and described in more detail herein. In another embodiment, the user interface 429 includes and/or is configured to provide and/or use information associated with one or more of the mathematical formulas illustrated in the table 501 in FIG. 5B and described in more detail herein.

FIG. 4 also illustrates a financial account system 430, in accordance with an embodiment of the present invention. In accordance with one embodiment, the financial account system 430 is maintained by a financial institution for the value attributable to its customers and/or employees. However, it will be understood that, in other embodiments, the financial account system 430 may be maintained by another entity and/or for the value attributable to other entities, including customers and/or employees of other businesses. For example, in another embodiment not shown, the financial account system 430 is maintained by a vendor and provides services to employees and/or customers of Bank A, as well as to the employees and/or customers of Bank B.

It will also be understood that the financial account system 430 may include any computerized apparatus configured to perform any one or more of the functions of the financial account system 430, as described herein. In some embodiments, for example, the financial account system 430 may include any one or more portions of a computer network, an engine, a platform, a server, a database system, a front end system, a back end system, a personal computer system, and/or some other type of computing device and/or system. In one embodiment, as illustrated in FIG. 4, the financial account system 430 includes a communication interface 432, a processor 434, and a memory 436, which includes a financial account application 437, a financial account datastore 438, and an ATM value application 439 stored therein. As shown, the communication interface 432 may be operatively and selectively connected to the processor 434, which is operatively and selectively connected to the memory 436.

According to some embodiments of the present invention, the financial account application 437 is operable to communicate with the user interface system 420 and/or with any one or more other portions of the system 400. In one embodiment, the financial account application 437 is operable to manage information about any one or more financial accounts and/or financial transactions. In another embodiment, the financial account application 437 is operable to initiate, perform, finalize, and/or facilitate one or more financial transactions using one or more financial accounts. In another embodiment, the financial account application 437 is operable to update financial account information, ATM information, and/or other information stored in the financial account datastore 438 based on, for example, financial transaction data and/or information about one or more ATMs communicated to the financial account system 430. It will be understood that, in some embodiments, the financial account application 437 includes computer-executable program code portions for instructing the processor 434 to perform any one or more of the functions of the financial account application 437 described herein. In some embodiments, the financial account application 437 may include and/or use one or more network and/or system communication protocols.

In addition to the financial account application 437, the memory 436 also includes an ATM value application 439, in accordance with an embodiment of the present invention. In some embodiments, the ATM value application 439 is operable to communicate with the user interface system 420 and/or any one or more other portions of the system 400. In some embodiments, the ATM value application 439 is operable to determine a value attributable to an ATM. For example, in one embodiment, the ATM value application 439 is operable to determine a value attributable to an ATM based at least partially on a comparison of financial account information associated with ATM users to financial account information associated with non-ATM users. As another example, in another embodiment, the ATM value application 439 is configured to determine a direct revenue, indirect revenue, direct expense, and/or indirect expense attributable to an ATM. In another embodiment, the ATM value application 439 is operable to determine an indirect revenue based at least partially on a retention premium, a cross sale premium, and/or a new sale premium. In another embodiment, the ATM value application 439 is operable to perform one or more of the mathematical calculations described herein, such as, for example, those illustrated in the table 501 in FIG. 5B. In another embodiment, the ATM value application 439 is operable to provide a graphical user interface, such as, for example, the graphical user interface 500 described in more detail in connection with FIG. 5A, for purposes of determining a value attributable to an ATM. In another embodiment, the ATM value application 439 is operatively connected to the financial account datastore 438 and is configured to access one or more portions of information stored therein. It will be understood that, in some embodiments, the ATM value application 439 includes computer-executable program code portions for instructing the processor 434 to perform any one or more of the functions of the ATM value application 439 described herein. In some embodiments, the ATM value application 439 may include and/or use one or more network and/or system communication protocols.

In addition to the financial account application 437 and ATM value application 439, the memory 436 also includes the financial account datastore 438. The financial account datastore 438 may include any one or more storage devices, including, but not limited to, datastores, databases, and/or any of the other storage devices typically associated with a computer system. In one embodiment, the financial account datastore 438 includes financial account information related to the functions of the one or more portions of the financial account system 430 as described herein. For example, the financial account datastore 438 may include information associated with one or more (or every) financial accounts (e.g., checking account, savings account, etc.) maintained by the financial institution, including, for example, account names, persons and/or entities associated with the financial accounts, addresses associated with the financial accounts, past financial transactions associated with the financial accounts, whether those persons, entities, and/or financial accounts were involved in an ATM transaction during a predetermined period of time, and/or any other type and/or amount of information, and/or the like. As another example, the financial account datastore 438 may include information associated with which financial accounts are associated with which predetermined geographic areas, which ATM users and/or non-ATM users are associated with which financial accounts, which ATMs have dispensed cash and/or otherwise provided financial services for which persons, entities, and/or financial accounts, and so on.

In another embodiment, the financial account datastore 438 may include information associated with one or more ATM users and/or non-ATM users, and/or ATMs. For example, in one embodiment, the financial account datastore 438 includes information comparing the financial account information associated with one or more ATM users to the financial account information associated with one or more non-ATM users. As another example, in another embodiment, the financial account datastore 438 include information associated with the number of transactions involving one or more ATM users and/or non-ATM users, the amount of revenue generated by one or more ATM users and/or non-ATM users, the number of sales made to one or more ATM users and/or non-ATM users, and so on. In one embodiment, the financial account datastore 438 includes information associated with a retention premium, a cross sale premium, and a new sale premium associated with one or more ATM users and/or non-ATM users.

In another embodiment, the financial account datastore 438 may include information associated with one or more ATMs and/or types of ATMs. For example, in another embodiment, the financial account datastore 438 may include information about ATMs that is organized by a predetermined geographic area (e.g., city, state, county, country, longitude/latitude, etc.), functionality type, approach type, location type, site type, and/or deployment type. In one embodiment, the financial account datastore 438 includes retention premium information, cross sale premium information, and/or new sale premium information associated with one or more ATMs. In one embodiment, the financial account datastore 438 includes retention premium information, cross sale premium information, and/or new sale premium information for every combination of functionality type, approach type, and/or deployment type of ATM. For example, the information stored in the financial account datastore 438 may indicate that an ATM that has partial functionality (e.g., only cash dispense, etc.), a drive-up approach, and a freestanding deployment may have a different retention premium, cross sale premium, and/or new sale premium than an ATM that has full functionality, a walk-up approach, and through the wall (TTW) deployment.

In another embodiment, the financial account datastore 438 may include information associated with the number of sites, average monthly transactions, percentage of full function ATMs, average monthly direct revenue, average monthly cross sale revenue, average monthly new sale revenue, average monthly retention revenue, average monthly migration revenue, average monthly indirect revenue, average monthly total revenue, average monthly total expense, and/or average monthly net benefit attributable to a group of ATMs having the same functionality type, approach type, location type, site type, and/or deployment type. In such an embodiment, for example, it may be determined that full function ATMs contribute a greater direct (and/or indirect) expense than partial function ATMs, that ATMs located in stores contribute a greater net benefit than ATMs located in movie theaters, that ATMs located outside contribute a greater indirect revenue than ATMs located inside, that kiosk ATMs contribute more direct revenue than that ATMs located in the southern United States contribute a greater migration revenue than ATMs located in the northern United States, that drive-up ATMs contribute greater retention revenue than walk-up ATMs, and so on. As another example, in another embodiment, the financial account datastore 438 includes, or includes information associated with, one or more maps, photographs, and/or graphical information associated with one or more ATMs, such as, for example, a map illustrating the location of the ATM in relation to one or more streets, landmarks, etc., a photograph illustrating the ATM situated in its surrounding environment and/or illustrating the ATM deployment type, site type, etc., and so on.

As another example, in another embodiment, the financial account datastore 438 includes ATM information organized by predetermined geographic area, such as, for example, the average revenue per ATM located in the predetermined geographic area, average number of transactions per ATM located in the predetermined geographic area, allocation percentage for the predetermined geographic area, the percentage of financial institution customers that are ATM users in the predetermined geographic area (and/or the percentage of financial institution customers that are non-ATM users in the predetermined geographic area), the average revenue per ATM user in the predetermined geographic area, the average sale per ATM user in the predetermined geographic area, and so on. In another embodiment, the financial account datastore 438 includes information associated with the average number of ATM user transactions over a predetermined period of time based on the functionality and/or site type of the ATM.

It will be understood that the financial account datastore 438 may store information in any known way, such as, for example, by using one or more computer codes and/or languages, alphanumeric character strings, data sets, figures, tables, charts, links, documents, and/or the like. In some embodiments, the financial account datastore 438 may include information associated with one or more applications, such as, for example, the financial account application 437 and/or the ATM value application 439. It will be understood that, in at least some embodiments of the present invention, the financial account datastore 438 provides a substantially real-time representation of the information stored therein, so that, for example, when the processor 434 accesses the financial account datastore 438, the information stored therein is current or substantially current.

It will be understood that some or all of the portions of the system 400 may be combined into a single portion, e.g., the user interface system 420 and the financial account system 430 may be combined into a single user interface and financial account system configured to perform all of the same functions of those separate portions as described herein. In another embodiment, as another example, the financial account application 437 and the ATM value application 439 may be combined into a single application configured to perform all of the same functions as those separate applications as described herein. Likewise, some or all of the portions of the system 400 may be separated into two or more distinct portions, e.g., the financial account system 430 may be separated into a financial account datastore system and an ATM value system.

In addition, the various devices, systems, and/or entities of the system 400 may be held, controlled, operated, managed, serviced, stored, maintained, etc. (herein "maintained" for simplicity) by the same or separate parties. For example, in one embodiment, the user interface system 420 is maintained by a third party vendor and a financial institution maintains the financial account system 430. As another example, in accordance with another embodiment, a financial institution maintains for the benefit of its employees the user interface system 420 and the financial account system 430.

It will also be understood that the system 400 may include and/or implement any embodiment of the present invention described herein. Further, in addition to FIG. 4, it will be understood that some embodiments of the system 400 may take the form of some other configuration and/or involve any other number of devices and/or entities. For example, in one embodiment, the user interface system 420 includes the ATM value application 439 instead of, or in addition to, the financial account system 430.

Now reference will be made to a more detailed embodiment of the present invention. In this embodiment, a user interface system, such as the user interface system 420 in the system 400, is configured to display one or more of the graphical user interfaces 500 and/or 501 illustrated in FIGS. 5A and 5B. It will be understood that these graphical user interfaces may include an Internet web page, an intranet web page, a browser screen, a spreadsheet, and/or some other graphical user interface. It will also be understood that, in some embodiments, the graphical user interface 500 is configured to navigate to and/or from the graphical user interface 501. It will also be understood that, in accordance with an embodiment, the graphical user interfaces 500 and 501 are maintained and/or provided by a financial institution for the benefit of its financial institution employees, such as, for example, a relationship manager tasked with determining the indirect and/or total value attributable to a proposed ATM.

It will be further understood that, in accordance with some embodiments, the graphical user interfaces 500 and 501 are associated with a computer-executable application configured to determine the estimated monthly indirect revenue attributable to a proposed remote ATM. As used in connection with FIGS. 5A-5D, the phrase "proposed remote ATM" refers to an individual remote ATM that has not yet been constructed. The proposed remote ATM is located in a predetermined geographic area and is maintained by a financial institution. In addition, the phrase "ATM user household," as used in connection with FIGS. 5A-5D, refers to a household that includes a past and/or present financial institution customer that has used an ATM located in the same predetermined geographic area at least once during a past one year period. Further, the phrase "non-ATM user household," refers to a household located in the predetermined geographic area and that includes a past and/or present financial institution customer that has not used an ATM located in the predetermined geographic area at least once during the one year period. Additionally, the phrases "existing ATM user households" and "existing non-ATM user households," as used in connection with FIGS. 5A-5D, refer to households that include people that have been financial institution customers for longer than the one year period. Still further, the phrases "new ATM user households" and "new non-ATM user households," as used in connection with FIGS. 5A-5D, refer to households that include people that have become new financial institution customers during the one year period.

In other embodiments, any one or more of the ATM, ATM user households, non-ATM user households, existing ATM user households, existing non-ATM user households, new ATM user households, and/or new non-ATM user households may be defined in other ways. For example, in some embodiments, the ATM refers to a particular existing ATM, ATM user households refers to households that include a financial institution customer that has used the particular existing ATM at least once during the one year period, and non-ATM user households refers to households that include a financial institution customer that has not used the particular existing ATM at least once during the one year period. As another example, in some embodiments, the ATM refers to a proposed remote ATM, ATM user households refers to remote ATM user households (e.g., a household that includes a financial institution customer that has used an existing remote ATM located in the same predetermined geographic area that will include the proposed remote ATM), and non-ATM user households refers to non-remote ATM user households (e.g., a household that includes a financial institution customer that has not used an existing remote ATM located in the same predetermined geographic area that will include the proposed remote ATM (but may have used some other type of ATM and/or an existing remote ATM located outside of the predetermined geographic area)) that are located in the same predetermined geographic area that will include the proposed remote ATM.

As shown in FIG. 5A, in accordance with an embodiment of the present invention, the graphical user interface 500 represents user inputs associated with determining the estimated monthly indirect revenue attributable to a proposed remote ATM. The information therein is divided between a number of categories and a corresponding number of entries. In operation, according to one embodiment, a user inputs information associated with proposed remote ATM into the graphical user interface 500, and then, based at least partially on those inputs, the computer-executable application determines the information provided in the graphical user interface 501 shown in FIG. 5B.

Referring now to the exemplary embodiment illustrated in FIG. 5A, the graphical user interface 500 includes the following categories and corresponding entries: a "Relationship Manager" category 516A and a corresponding "John Doe" entry 516B; a "Number of ATM Sites" category 517A and a corresponding "1" entry 517B; an "Install Date (MM/YY)" category 518A and a corresponding "08/09" entry 518B; a "Length of Contract (in months)" category 519A and a corresponding "12" entry 519B; a "Total Number of ATMs" category 520A and a corresponding "1" entry 520B; a "Site Name" category 521A and a corresponding "AnyCity Office Building" entry 521B; a "Site Type" category 522A and a corresponding "Office" entry 522B; a "Deployment Type" category 523A and a corresponding "Freestanding" entry 523B; a "Branding Type" category 524A and a corresponding "Branded" entry 524B; a "Functionality Type" category 525A and a corresponding "Full Function" entry 525B; an "Approach Type" category 526A and a corresponding "Walk Up" entry 526B; a "City" category 527A and a corresponding "AnyCity" entry 527B; a "State" category 528A and a corresponding "AnyState" entry 528B; a "Metropolitan Area" category 529A and a corresponding "AnyCity-AnyTown, AnyState" entry 529B; a "Latitude" category 530A and a corresponding "38.9123" entry 530B; a "Longitude" category 560A and a corresponding "−94.3123" entry 560B; a "Nearest Banking Center" category 561A and a corresponding "AnyStreet Banking Center" entry 561B; and a "Nearest ATM" category 562A and a corresponding "AnyCity Gas Station" entry 562B.

In general terms, this information provided in the graphical user interface 500 indicates that the relationship manager, John Doe, has initiated a monthly indirect revenue determination for a single proposed remote ATM, which will be the only financial institution ATM located at the site. The date scheduled to install the proposed remote ATM is August 2009, and the length of the contract for the proposed remote ATM is 12 months. The proposed remote ATM will be placed in an office setting in the AnyCity Office Building, will be deployed as a freestanding machine, will be branded by the financial institution, will be a full function ATM, and will have a walk up approach type. In addition, the proposed remote ATM will be located in AnyCity, AnyState, which is a part of the larger metropolitan area of AnyCity-AnyTown, AnyState. The proposed remote ATM will be located at the latitude and longitude coordinates 38.9123, −94.3123. The nearest banking center to the proposed remote ATM is located at the AnyStreet Banking Center. The nearest ATM to the proposed remote ATM is located at the AnyCity Gas Station.

The graphical user interface 500 also includes the following categories and corresponding entries: a "Monthly On Us Deposits" category 563A and a corresponding "2,340" entry 563B; a "Monthly On Us Withdrawals" category 564A and a corresponding "4,567" entry 564B; a "Monthly On Us Other Transactions" category 565A and a corresponding "860" entry 565B; a "Monthly Foreign Withdrawals" category 566A and a corresponding "1,109" entry 566B; a "Monthly Foreign Other Transactions" category 567A and a corresponding "633" entry 567B; a "Total Monthly Foreign Transactions" category 568A and a corresponding "1,742" entry 568B; a "Total Monthly On Us Transactions" category 569A and a corresponding "7,767" entry 569B and a "Total Monthly Transactions" category 570A and a corresponding "9,509" entry 570B.

In general terms, this information provided in the graphical user interface 500 indicates that the relationship manager has estimated that the proposed remote ATM will execute 2,340 on us deposits, 4,567 on us withdrawals, and 860 other on us transactions. The relationship manager also estimates that the proposed remote ATM will execute 1,109 foreign withdrawals (e.g., non-financial institution customers making withdrawals using the proposed remote ATM) and 633 other foreign transactions. Thus, the relationship manager estimates that the proposed remote ATM will execute a total of 9,509 transactions per month, 1,742 of which are foreign transactions and 7,767 of which are on us transactions.

It will be understood that one or more (or all) of the information provided in the graphical user interface 500 may be based in part or entirely on user inputs. For example, in one embodiment, the relationship inputs every category and every entry into the graphical user interface 500. As another example, in another embodiment, the categories in the graphical user interface 500 are fixed, and the relationship manager inputs the corresponding entries into the graphical user interface 500. In still another embodiment, one or more of the categories and/or entries may be populated and/or otherwise determined by the computer-executable application associated with the graphical user interface 500. For example, in one embodiment, a user may enter an entry for the site type category 522A, the deployment type category 523A, the branding type category 524A, the functionality type category 525A, the approach type category 526A, the city category 527A, the state category 528A, and/or the metropolitan area category 529A, and based on one or more of those entries, the application may automatically determine and/or populate the entries for the monthly on-us deposits category 563A, the monthly on us withdrawals category 564A, the monthly on us other transactions category 565A, the monthly foreign withdrawals category 566A, the monthly foreign other transactions category 567A, the total monthly foreign transactions category 568A, the total monthly on us transactions category 569A, and/or the total monthly transactions category 570A. In some embodiments, the names, types, and/or number of one or more rows, categories, and/or entries may be restricted. For example, in one embodiment, a user may only enter a particular type of entry for the site type 522A, deployment type 523A, branding type 524A, functionality type 525A, approach type 526A, and/or metropolitan area 529A, where the types of entries available to the user appear in a drop-down list or some other type of list associated with the relevant category.

Referring now to the exemplary embodiment illustrated in FIG. 5B, in accordance with an embodiment of the present invention, the graphical user interface 501 represents outputs associated with determining the estimated monthly indirect revenue attributable to a proposed remote ATM. As shown, the graphical user interface 501 includes information that is divided up into two rows, and each row includes a number of categories and a corresponding number of entries. As mentioned previously, in accordance with some embodiments, the information provided in the first row 531 and the information provided in the second row 542 are based at least partially on one or more of the categories and/or corresponding entries provided in the graphical user interface 500 in FIG. 5A. In one embodiment, the information provided in the first row 531 is determined based at least partially on a comparison of one or more categories and/or entries from the graphical user interface 500 to information stored in a financial institution datastore. In another embodiment, the information provided in the second row 542 is based at least partially on one or more mathematical calculations involving one or more categories and/or entries provided in the graphical user interface 500 and/or the graphical user interface 501, such as, for example, one or more of the categories and/or entries provided in the first row 531. In some embodiments, once the user inputs information into the graphical user interface 500, the computer-executable application may automatically populate, calculate, provide, and/or otherwise determine the information provided in the first row 531 and/or the second row 542 of the graphical user interface 501.

As shown in the first row 531 of the graphical user interface 501, the categories and corresponding entries include: a "Retention Premium" category 532A and a corresponding "2.70%" entry 532B; a "Monthly Transactions Per User Household" category 533A and a corresponding "2.87" entry 533B; an "Allocation Percentage" category 534A and a corresponding "62.30%" entry 534B; an "Average Monthly Revenue Per User Household" category 535A and a corresponding "$99" entry 535B; a "New Sale Premium" category 536A and a corresponding "8.32%" entry 536B; a "Cross Sale Premium" category 537A and a corresponding "−0.34%" entry 537B; a "New User Household Percentage" category 538A and a corresponding "7%" entry 538B; an "Existing User Household Percentage" category 539A and a corresponding "93%" entry 539B; an "Average Revenue Per Sale" category 540A and a corresponding "$102" entry 540B; and a "Migration Cost Save Per User Household" category 541A and a corresponding "$0.08" entry 542A.

In general terms, the information provided in the first row 531 represents one or more calculations, assumptions, outputs, and/or determinations associated with one or more of the categories and/or entries from the graphical user interface 500. For example, in the embodiment shown, based at least partially on the functionality type, approach type, and/or deployment type information provided in the graphical user interface 500, the application associated with the graphical user interfaces 500 and 501 is configured to determine that the proposed remote ATM will have a retention premium of 2.70%, a new sale premium of 8.32%, and a cross sale premium of −0.34%. Based at least partially on the site type information provided in the graphical user interface 500, the application is configured to determine that the proposed remote ATM will execute 2.87 monthly transactions per user household. Based at least partially on the city, state, metropolitan area, longitude/latitude, nearest banking center, and/or nearest ATM information provided in the graphical user interface 500, the application is configured to determine that the proposed remote ATM will have an allocation percentage of 62.30%, a new user household percentage of 7%, an existing user household percentage of 93%, and a migration cost save per user of $0.08. Based at least partially on the nearest banking center information provided in the graphical user interface 500, the application is configured to determine that the average monthly revenue per user household will be $99. Based at least partially on the city, state, metropolitan area, longitude/latitude, nearest banking center, and/or nearest ATM information provided in the graphical user interface 500, the application is configured to determine that the average revenue per sale will be $102.

In the second row 542, the categories and corresponding entries include: a "Projected User Households" category 543A and a corresponding "2,706" entry 543B; an "Allocated Retention Premium" category 544A and a corresponding "1.68%" entry 544B; a "New User Households" category 545A and a corresponding "189" entry 545B; an "Existing User Households" category 546A and a corresponding "2,517" entry 546B; an "Allocated Monthly New Sales" category 547A and a corresponding "0.82" entry 547B; an "Allocated Monthly Cross Sales" category 548A and a corresponding "−0.44" entry 548B; an "Estimated Monthly Retention Revenue" category 549A and a corresponding "$4,501" entry 549B; an "Estimated Monthly New Sale Revenue" category 550A and a corresponding "$84" entry 550B; an "Estimated Monthly Cross Sale Revenue" category 551A and a corresponding "−$45" entry 551B; an "Estimated Monthly Migration Revenue" category 552A and a corresponding "$216" entry 552B; and an "Estimated Monthly Indirect Revenue" category 553A and a corresponding "$4,756" entry 553B.

In accordance with one embodiment of the present invention, the information provided in the second row 542 represents the outputs associated with one or more of the inputs and/or outputs from the graphical user interface 500 and/or the first row 531. For example, according to some embodiments, the estimated monthly indirect revenue (EMIR) 553A equals the sum of the estimated monthly cross sale revenue (EMCSR) 551A, the estimated monthly new sale revenue (EMNSR) 550A, the estimated monthly retention revenue (EMRR) 549A, and the estimated monthly migration revenue (EMMR) 552A: EMIR=EMCSR+EMNSR+EMRR+EMMR. In some embodiments, the estimated monthly cross sale revenue (EMCSR) 551A equals the product of the allocated monthly cross sales (AMCS) 548A and the average revenue per sale (ARPS) 540A: EMCSR=AMCS×ARPS. In some embodiments, the estimated monthly new sale revenue (EMNSR) 550A equals the product of the allocated monthly new sales (AMNS) 547A and the average revenue per sale (ARPS) 540A: EMNSR=AMNS×ARPS. In some embodiments, the estimated monthly retention revenue (EMRR) 549A equals the product of the projected user households (PUH) 543A, the average monthly revenue per user household (AMRPUH) 535A, and the allocated retention premium (ARP) 544A: EMRR=PUH×AMRPUH×ARP. In some embodiments, the estimated monthly migration revenue (EMMR) 552A equals the product of the projected user households (PUH) 543A and the migration cost save per user household (MCSPUH) 541A: EMMR=PUH×MCSPUH.

Further, according to some embodiments, the projected user households (PUH) 543A equals the total monthly on us transactions (TMOUT) 569A divided by the monthly transactions per user household (MTPUH) 533A:

$$PUH = \frac{TMOUT}{MTPUH}.$$

In some embodiments, the allocated retention premium (ARP) 544A equals the product of the retention premium (RP) 532A and the allocation percentage (AP) 534A: ARP=RP×AP. In some embodiments, the new user households (NUH) 545A equals the product of the new user household percentage (NUHP) 538A and the projected user households (PUH) 543A: NUH=NUHP×PUH. In some embodiments, the existing user households (EUH) 546A equals the product of the existing user household percentage (EUHP) 539A and the projected user households (PUH) 543A: EUH=EUHP×PUH. In some embodiments, the allocated monthly new sales (AMNS) 547A equals the product of the new sale premium (NSP) 536A, the number of new user households (NUH) 545A, and the allocation percentage (AP) 534A, all divided by 12 (i.e., the number of months in the one year period):

$$AMNS = \frac{NSP \times NUH \times AP}{12}.$$

In some embodiments, the allocated monthly cross sales (AMCS) 548A equals the product of the cross sale premium (CSP) 537A, the number of existing user households (EUH) 546A, and the allocation percentage (AP) 534A, all divided by 12 (i.e., the number of months in the one year period):

$$AMCS = \frac{CSP \times EUH \times AP}{12}.$$

In general terms, the exemplary information provided in the second row 542 represents that, based on some of the information provided in the graphical user interface 500 and/or the first row 531, 2,706 user households are projected to use the proposed remote ATM site, of which 189 user households will be new user households and 2,517 user households will be existing user households. Further, based on some of the information provided in the graphical user interface 500 and/or the first row 531, the retention premium allocated to the proposed remote ATM will be 1.68%. In addition, the number of monthly sales made to new ATM user households allocated to the proposed remote ATM is 0.82. The number of monthly sales made to existing user households allocated to the proposed remote ATM is −0.44. In addition, the estimated monthly retention revenue, new sale revenue, cross sale revenue, and migration revenue allocated to the proposed remote ATM is $4,501, $84, −$45, and $216, respectively. Thus, the estimated monthly indirect revenue allocated to the proposed remote ATM is $4,756.

Of course, it will be understood that other embodiments of the present invention may include more, fewer, and/or different names, types, and/or numbers of categories and/or entries than those shown in the graphical user interfaces 500 and 501. For example, in some embodiments, the graphical user interface 500 may alternatively or additionally include categories and/or entries associated with determining another value attributable to the proposed remote ATM, such as, for example, a total value, direct expense, direct revenue, and/or indirect revenue attributable to the proposed remote ATM. In other embodiments, the graphical user interface 500 may alternatively or additionally include inputs associated with determining a value attributable to an ATM that is not a proposed remote ATM, such as, for example, a proposed banking center ATM, an existing remote ATM, an existing proposed remote ATM, etc. Also, in some embodiments, in addition to or instead of what is illustrated in FIG. 5A, the graphical user interface 500 may include an intranet web page, an Internet web page, and/or some other kind of graphical user interface.

Regarding the graphical user interface 501, in some embodiments, some or all of the information provided in the first row 531 and/or second row 542 is determined based at least partially on one or more comparisons of financial transaction information associated with ATM user households to financial transaction information associated with non-ATM user households. In some embodiments, these one or more comparisons may be done in real time or substantially real time. In some embodiments, some or all of the information provided in the first row 531 and/or second row 542 is retrieved from a predetermined table and/or list, such as, for example, a table and/or list of information stored in a financial account datastore that may be updated continuously or periodically (e.g., every day, every six months, etc.). For example, in some embodiments, the financial account datastore may include a table of information that shows the cross sale premium, new sale premium, and/or retention premium for each ATM in a financial institution ATM network. As another example, the datastore may list the average cross sale premium, new sale premium, and/or retention premium for each site type, deployment type, branding type, functionality type, and/or approach type of ATM. As another example, the datastore may include information about the average number of monthly transactions per user household by metropolitan area.

It will also be understood that, instead of representing the number of monthly sales made to new ATM user households allocated to the proposed remote ATM, in some embodiments, the allocated monthly new sales represents the number of monthly sales made to new households (e.g., households that include a person who became a customer of the financial institution during the predetermined period of time) allocated to the proposed remote ATM. In such an embodiment, the allocated monthly new sales (AMNS) equals the product of the new sale premium (NSP) (the calculation of which may be different from that described above), the number of new households (NH) (the calculation of which may be different from that described above), and the allocation percentage (AP), all divided by the appropriate time period (e.g., 12 months if looking at monthly new sales for data collected over one year):

$$AMNS = \frac{NSP \times NH \times AP}{12}.$$

As another example, instead of representing the number of monthly sales made to existing ATM user households allocated to the proposed remote ATM, in some embodiments, the allocated monthly cross sales represents the number of monthly sales made to existing households (e.g., households that include a person who became a customer of the financial institution before the predetermined period of time) allocated to the proposed remote ATM. In such an embodiment, the allocated monthly cross sales (AMCS) equals the product of the cross sale premium (C SP) (the calculation of which may be different from that described above), the number of existing households (EH) (the calculation of which may be different from that described above), and the allocation percentage (AP), all divided by the appropriate time period (e.g., 12 months if looking at monthly cross sales for data collected over one year):

$$AMCS = \frac{CSP \times EH \times AP}{12}.$$

It will also be understood that, in some embodiments, the information provided in the graphical user interfaces 500 and/or 501 may be based on another period of time (e.g., a week, month, quarter, etc.) and/or may involve other types of financial institution customers. For example, in some embodiments, the information provided in the graphical user interfaces 500 and/or 501 involve ATM users and non-ATM users instead of ATM user households and non-ATM user households. As another example, in some embodiments, the information provided in the graphical user interfaces 500 and/or 501 involve remote ATM user households and non-remote ATM user households (both of which are ATM user households) instead of ATM user households and non-ATM user households. In some embodiments, one or more portions of the information provided in the graphical user interfaces 500 and/or 501 may be displayed in and/or based at least partially on some kind of statistic, such as, for example, a means, median, average, and/or other type of statistic.

Additionally, it will be understood that, in accordance with some embodiments, the graphical user interfaces 500 and 501 may additionally or alternatively include, be accompanied by, and/or be associated with one or more maps, photographs, and/or other graphical information associated with the ATM. It will be understood that this graphical information may be an input, an output, and/or supporting information for use in determining a value of an ATM. For example, FIG. 5C illustrates a map 580 associated with one or more of the embodiments described in connection with FIGS. 5A and 5B, in accordance with an embodiment of the present invention. In this embodiment, the map 580 shows the geographic location for the proposed remote ATM at the AnyCity Office Building site 581 in relation to the surrounding streets, rivers, landmarks, etc. The map 580 also includes the location of the nearest banking center, AnyStreet Banking Center 583, and the location of the nearest ATM, the ATM located at the AnyCity Gas Station 582. In addition to providing geographic information, the map 580 may also provide other information and/or be used for other purposes. For example, in some embodiments, a system for determining a value of an ATM located in the geographic area shown in the map 580 is configured to use only financial account information of ATM users and/or non-ATM users that reside in the geographic area shown in the map 580 to make its determinations.

As another example, FIG. 5D illustrates a photograph 590 associated with one or more of the embodiments described in connection with FIGS. 5A and 5B (and/or 5C), in accordance with an embodiment of the present invention. In this embodiment, the photograph 590 illustrates a remote ATM 591 in its surrounding environment. According to some embodiments, such as that shown in FIG. 5D, the photograph 590 also illustrates the deployment type, site type, branding type, functionality type, approach type, and/or location type of the ATM. Where the proposed remote ATM has not yet been installed, a photograph of another ATM having the same and/or similar deployment type, site type, branding type, functionality type, approach type, and/or location type as the proposed remote ATM may be used. For example, as shown in the FIG. 5D, the photograph 590 illustrates a remote ATM having a similar deployment type, site type, branding type, functionality type, approach type, and/or location type as the proposed remote ATM intended for the AnyCity Office Building 581. Where the ATM already exists in its intended environment, a photograph of the actual remote ATM may be used. It will be understood that these photographs, including the photograph 590, may be used to help the relationship manager and/or another user of the graphical user interfaces 500 and/or 501 better understand, communicate, and/or record the ATM information provided in those interfaces.

It will also be understood that the graphical user interfaces 500 and 501 and/or the map 580 and/or photograph 590 may be associated with and/or implemented in any of the apparatuses and/or methods described herein. For example, in one embodiment, the user interface system 420 and/or financial account system 430 of the system 400 is configured to provide the graphical user interfaces 500 and 501 and/or the map 580 and/or the photograph 590 to a user. As another example, in one embodiment, the graphical user interfaces 500 and 501 and the associated computer-executable application may be used to determine the total value attributable to an ATM according to the method described in the block diagram 300 of FIG. 3.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system comprising:
a computer apparatus including a processor and a memory; and
a software module stored in the memory, comprising executable instructions that when executed by the processor cause the processor to:
input information associated with a type of an automated teller machine (ATM) in a graphical user interface;
provide a map associated with the ATM based on the inputted information;
divide the map into a first geographic area and a second geographic area, the first geographic area being defined by an ATM location positioned a first distance from the ATM and the second geographic area being defined by a banking center location positioned a second distance from the ATM, wherein the second geographic area is greater than the first geographic area:
determine a value attributable to an automated teller machine (ATM) the ATM based at least partially on financial account information of ATM users and non-ATM users that reside in the first geographic area or second geographic area and an indirect revenue calculated as the sum of (i) a retention premium comprising the percentage difference in the retention rate of ATM users and the retention rate of non-ATM users over a period of time, wherein the ATM users comprise users that have used the ATM at least once during the period of time and the non-ATM users comprise users that have never used the ATM during the period of time, (ii) a cross sale premium comprising a percentage difference of sales of financial accounts, loans, or non-financial products to existing ATM users and sales of financial accounts, loans, or non-financial products to existing non-ATM users over the period of time, wherein the existing ATM users comprise ATM users that have been financial institution customers for longer than the period of time and the existing non-ATM users comprise non-ATM users that have been financial institution customers for longer than the period of time, and (iii) a new sale premium comprising a percentage difference of sales of financial accounts, loans, or non-financial products to new ATM users and sales of financial accounts, loans, or non-financial products to new non-ATM users over the period of time, wherein the new ATM users comprise ATM users that have become new financial institution customers during the period of time and the new non-ATM users comprises non-ATM users that have become new financial institution customers during the period of time and at least one of a functionality type indicating whether the ATM is fully functional or not fully functional, approach type indicating that the ATM is a walk up ATM, or deployment type indicating whether the ATM is free standing or not free standing; and
maintain the ATM in the first geographic area or second geographic area based on the value attributable to the ATM.

2. The system of claim 1, wherein the at least one of the retention premium, cross sale premium, or new sale premium is based at least partially on at least one of the functionality type, approach type, location type, site type, branding type, or deployment type associated with the ATM.

3. A method comprising:
launching a computer-executable application, wherein the computer-executable application comprises a graphical user interface;
inputting, into the graphical user interface, information associated with a type of automated teller machine (ATM);
providing, via the graphical user interface, a map associated with the ATM based on the inputted information;
dividing the map into a first geographic area and a second geographic area, the first geographic area being defined by an ATM location positioned a first distance from the ATM and the second geographic area being defined by a banking center location positioned a second distance from the ATM, wherein the second geographic area is greater than the first geographic area:

determining a value attributable to the ATM based at least partially on financial account information of ATM user and non-ATM users that reside in the first geographic or second geographic area and an indirect revenue calculated as the sum of (i) a retention revenue comprising revenue attributable to the ATM based at least partially on a retention premium comprising the difference in the percentage of ATM users that remain a financial institution customer during a predetermined period of time and the percentage of non-ATM users that remain a financial institution customer during the predetermined period of time, wherein the ATM users comprise users that have used the ATM at least once during the period of time and the non-ATM users comprise users that have never used the ATM during the period of time, (ii) a cross sale revenue comprising revenue attributable to the ATM based on a cross sale premium comprising a percentage difference of sales of financial accounts, loans, or non-financial products made to existing ATM users and sales of financial accounts, loans, or non-financial products made to existing non-ATM users during the predetermined period of time, wherein the existing ATM users comprise ATM users that have been financial institution customers for longer than the predetermined period of time and the existing non-ATM users comprise non-ATM users that have been financial institution customers for longer than the predetermined period of time, and (iii) a new sale revenue comprising revenue attributable to the ATM based on a new sale premium comprising a percentage difference of sales of financial accounts, loans, or non-financial products made to new ATM users and sales of financial accounts, loans, or non-financial products made to new non-ATM users during the predetermined period of time, wherein the new ATM users comprise ATM users that have become new financial institution customers during the period of time and the new non-ATM users comprise non-ATM users that have become new financial institution customers during the period of time; and maintaining the ATM in the first geographic area or second geographic area based on the value attributable to the ATM.

4. The method of claim 3, wherein the inputting, into the graphical user interface, information associated with a type of ATM comprises:

inputting at least one of a site type, deployment type, location type, functionality type, branding type, or approach type associated with the ATM.

5. The method of claim 3, wherein the type of ATM is used by the computer-executable application to determine at least one of the retention premium, the cross sale premium, or the new sale premium.

6. The method of claim 3, further comprising:

inputting, into the graphical user interface, information associated with a number of transactions associated with the ATM, and wherein the estimated indirect revenue attributable to the ATM is based at least partially on the number of transactions associated with the ATM.

7. A computer program product comprising:

a non-transitory computer readable storage medium having computer readable program code embodied therewith, the computer readable program code comprising:

computer readable program code configured to input information associated with a type of an automated teller machine (ATM) in a graphical user interface;

computer readable program code configured to provide a map associated with the ATM based on the inputted information;

computer readable program code configured to divide the map into a first geographic area and a second geographic area, the first geographic area being defined by an ATM location positioned a first distance from the ATM and the second geographic area being defined by a banking center location positioned a second distance from the ATM, wherein the second geographic area is greater than the first geographic area;

computer readable program code configured to determine a value attributable to the ATM based at least partially on financial account information of ATM users and non-ATM users that reside in the first geographic area or second geographic area and an indirect revenue calculated as the sum of (i) a retention premium comprising the percentage difference in the retention rate of ATM users and the retention rate of non-ATM users over a period of time, wherein the ATM users comprise users that have used the ATM at least once during the period of time and the non-ATM users comprise users that have never used the ATM during the period of time, (ii) a cross sale premium comprising a percentage difference of sales of financial accounts, loans, or non-financial products to existing ATM users and sales of financial accounts, loans, or non-financial products to existing non-ATM users over the period of time, wherein the existing ATM users comprise ATM users that have been financial institution customers for longer than the period of time and the existing non-ATM users comprise non-ATM users that have been financial institution customers for longer than the period of time, and (iii) a new sale premium comprising a percentage difference of sales of financial accounts, loans, or non-financial products to new ATM users and sales of financial accounts, loans, or non-financial products to new non-ATM users over the period of time, wherein the new ATM users comprise ATM users that have become new financial institution customers during the period of time and the new non-ATM users comprises non-ATM users that have become new financial institution customers during the period of time; and computer readable program code configured to maintain the ATM in the first geographic area or second geographic area based on the value attributable to the ATM.

8. The computer program product of claim 7, wherein the indirect revenue is based at least partially on an allocation percentage, wherein the allocation percentage comprises a percentage of user revenue that may be attributable to the ATM.

9. The computer program product of claim 8: wherein the allocation percentage is at least partially based on the number of ATMs located in the first geographic area or second geographic area.

10. The computer program product of claim 8, further comprising computer readable program code configured to calculate the retention revenue as the product of a total number of ATM users, the retention premium, the allocation percentage, and revenue per ATM user, wherein the retention premium comprises the percentage difference in the retention rate between ATM users and non-ATM users over the predetermined period of time.

11. The computer program product of claim 8, further comprising computer readable program code configured to calculate the cross sale revenue as the product of a total number of ATM users, a cross sale premium, the allocation percentage, and a revenue per sale, wherein the cross sale premium comprises the percentage difference in sales made to existing ATM user and sales made to existing non-ATM users during the predetermined period of time.

12. The computer program product of claim 8, further comprising computer readable program code configured to calculate the new sale revenue as the product of a total number of new ATM users, a new sale premium, the allocation percentage, and revenue per sale, wherein the new sale premium comprises the percentage difference in sales made to new ATM users and sales made to new non-ATM user during the predetermined period of time.

13. The computer program product of claim 7, further comprising computer readable program code configured to calculate a migration revenue as the product of a total number of ATM users and the migration cost save per ATM user, wherein the migration cost save per ATM user comprises the difference in a cost of a teller transaction and a cost of an ATM transaction.

\* \* \* \* \*